United States Patent
Ido et al.

(10) Patent No.: US 10,398,917 B2
(45) Date of Patent: Sep. 3, 2019

(54) DRAG REDUCER AND FIRE-EXTINGUISHING AGENT

(71) Applicant: SUMITOMO SEIKA CHEMICALS CO., LTD., Kako-gun, Hyogo (JP)

(72) Inventors: Toru Ido, Himeji (JP); Akira Kimura, Himeji (JP); Noboru Yamaguchi, Himeji (JP); Amina Tashiro, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 15/532,654

(22) PCT Filed: Dec. 2, 2015

(86) PCT No.: PCT/JP2015/083860
§ 371 (c)(1),
(2) Date: Jun. 2, 2017

(87) PCT Pub. No.: WO2016/088794
PCT Pub. Date: Jun. 9, 2016

(65) Prior Publication Data
US 2017/0326398 A1 Nov. 16, 2017

(30) Foreign Application Priority Data
Dec. 5, 2014 (JP) .................. 2014-247309

(51) Int. Cl.
*A62D 1/00* (2006.01)
*C09K 3/00* (2006.01)
*C08L 71/02* (2006.01)

(52) U.S. Cl.
CPC ............... *A62D 1/005* (2013.01); *A62D 1/00* (2013.01); *C08L 71/02* (2013.01); *C09K 3/00* (2013.01); *C08L 2201/54* (2013.01)

(58) Field of Classification Search
CPC ..................................................... A62D 1/005
See application file for complete search history.

(56) References Cited

U.S. PATENT DOCUMENTS

| 3,961,639 | A | 6/1976 | Chang et al. |
| 2013/0281577 | A1 | 10/2013 | Chen et al. |

FOREIGN PATENT DOCUMENTS

| GB | 1352284 | A | | 5/1974 | |
| JP | 49-014197 | B1 | | 4/1974 | |
| JP | 54-030700 | A | | 3/1979 | |
| JP | 10204183 | A | * | 8/1998 | ............... C08J 3/03 |
| JP | 2000-136396 | A | | 5/2000 | |
| JP | 2001-187875 | A | | 7/2001 | |
| JP | 2002-020725 | A | | 1/2002 | |

OTHER PUBLICATIONS

English machine translation of Masato et al. JP-10204183-A (Year: 1998).*
International Search Report of PCT/JP2015/083860 dated Mar. 1, 2016 [PCT/ISA/210].
Extended European Search Report dated Jul. 9, 2018 for EP Application No. 15864682.8.

* cited by examiner

*Primary Examiner* — Peter F Godenschwager
(74) *Attorney, Agent, or Firm* — Sughrue Mion, PLLC

(57) ABSTRACT

The invention provides a drag reducer having an excellent frictional drag-reducing effect on an aqueous medium and the like and also provides a fire-extinguishing agent including this drag reducer. The drag reducer according to the present invention includes a polyalkylene oxide aqueous dispersion that includes a polyalkylene oxide, aluminum oxide, an electrolyte, and water, and that has the polyalkylene oxide dispersed therein. The drag reducer has an excellent frictional drag-reducing effect on an aqueous medium and the like.

20 Claims, 1 Drawing Sheet

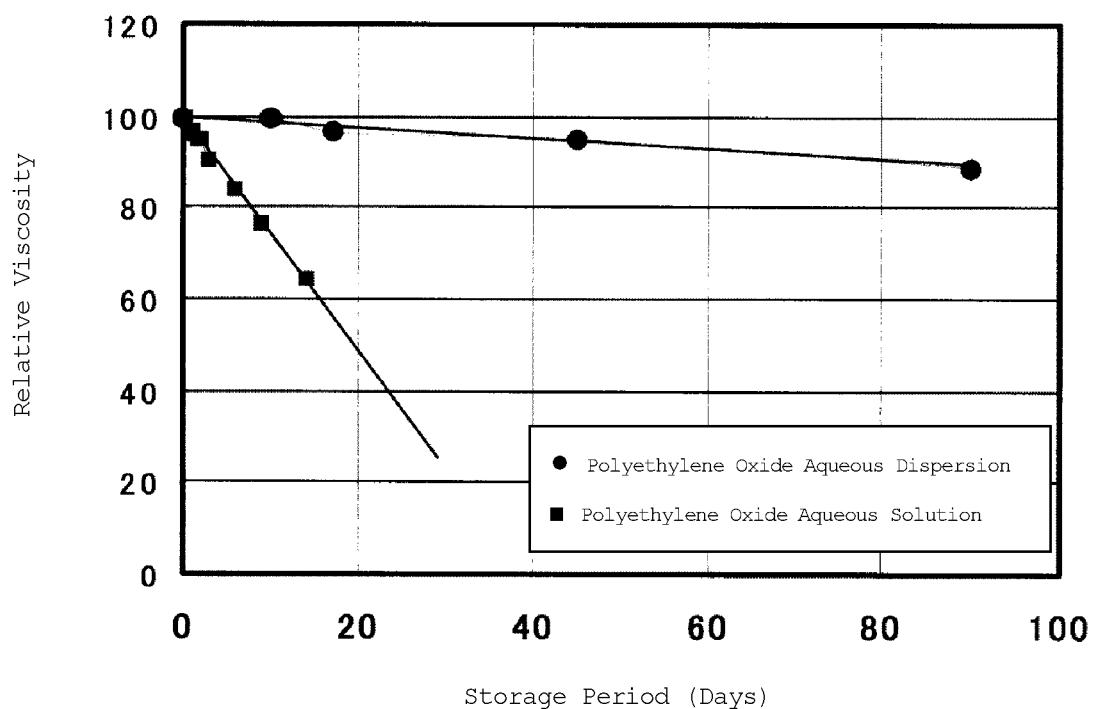

DRAG REDUCER AND FIRE-EXTINGUISHING AGENT

CROSS REFERENCE TO RELATED APPLICATIONS

This application is a National Stage of International Application No. PCT/JP2015/083860, filed Dec. 2, 2015, claiming priority based on Japanese Patent Application No. 2014-247309, filed Dec. 5, 2014, the contents of both of which are incorporated herein by reference in their entirety.

TECHNICAL FIELD

The present invention relates to a drag reducer capable of reducing the frictional drag of, for example, an aqueous medium and also relates to a fire-extinguishing agent including this drag reducer.

BACKGROUND ART

Polyalkylene oxides, represented by polyethylene oxide, are known to have a wide range of applications, for example, in fire-extinguishing agents, dispersants, thickener of fabric, antistatic agents, and flocculants. Polyalkylene oxides are thus industrially useful water-soluble polymers. For example, when being added to an aqueous medium, a polyalkylene oxide increases the viscosity of the aqueous medium. This thickening effect caused by the polyalkylene oxide can reduce the frictional drag of the aqueous medium inside a pipe in the process of delivering the aqueous medium through the pipe, enabling efficient delivery of the aqueous medium (e.g., see PTL 1). In particular, polyethylene oxide added to fire-extinguishing water reduces the frictional drag between the water and the pipe when the water flows through the pipe. This increases the velocity and flying distance of fire-extinguishing water sprayed from the pipe, thus enabling efficient fire extinction (e.g., see PTL 2 and 3). In addition, the thickening effect of the polyalkylene oxides can enhance the adhesion of fire-extinguishing water to the target of the fire extinction and delay the evaporation of the water, enabling more effective fire extinction.

CITATION LIST

Patent Literature

PTL 1: JP2001-187875A
PTL 2: Japanese Patent NO. S49-14197
PTL 3: JPS54-30700A

SUMMARY OF INVENTION

Technical Problem

However, pumping a polyalkylene oxide aqueous solution into a pipe, for example, allows the pump pressure to exert a mechanical shear force on the aqueous solution, leading to cleavage of the chemical bonds in the molecules of the polyalkylene oxide and destruction of the molecular structure. This reduces the thickening effect brought about by the polyalkylene oxide, and may hinder the frictional drag-reducing effect described above. Thus, for example, when a polyalkylene oxide aqueous solution is used as a drag reducer for fire-extinguishing water, the frictional drag-reducing effect brought about by the polyalkylene oxide will have been decreased by the time the water flows through a pipe. This affects the velocity of the fire-extinguishing water delivered into the pipe and the distance over which the fire-extinguishing water travels.

The present invention was made in view of the status-quo described above. An object of the invention is to provide a drag reducer excellent in reducing the frictional drag of an aqueous medium and the like, and to provide a fire-extinguishing agent including this drag reducer.

Solution to Problem

The present inventors conducted extensive research to achieve the object, and found that a drag reducer containing a polyalkylene oxide aqueous dispersion can achieve the object, and completed the invention.

Specifically, the present invention relates to the following drag reducer and fire-extinguishing agent.

Item 1.
A drag reducer comprising a polyalkylene oxide aqueous dispersion,
the dispersion comprising a polyalkylene oxide, aluminum oxide, an electrolyte, and water,
the dispersion having the polyalkylene oxide dispersed therein.

Item 2.
The drag reducer according to Item 1, wherein the polyalkylene oxide has a viscosity average molecular weight of 100000 to 10000000.

Item 3.
The drag reducer according to Item 1 or 2, wherein the polyalkylene oxide comprises at least one member selected from the group consisting of polyethylene oxides and ethylene oxide-propylene oxide copolymers.

Item 4.
The drag reducer according to any one of Items 1 to 3, wherein the electrolyte comprises at least one member selected from the group consisting of ammonium sulfate and ammonium phosphate.

Item 5.
The drag reducer according to any one of Items 1 to 4, wherein the mass ratio of the electrolyte to the water, electrolyte/water, is 0.11 or more.

Item 6.
The drag reducer according to any one of Items 1 to 5, for use in an aqueous medium.

Item 7.
The drag reducer according to Item 6, wherein the aqueous medium is fire-extinguishing water.

Item 8.
A fire-extinguishing agent comprising the drag reducer according to any one of Items 1 to 7.

Advantageous Effects of Invention

The drag reducer according to the present invention contains a polyalkylene oxide aqueous dispersion. The polyalkylene oxide contained in this polyalkylene oxide aqueous dispersion is not prone to disintegration of its molecular structure, even when being subjected to a mechanical shear force. For example, delivering the drag reducer into a pipe using a pump or similar device is unlikely to decrease the frictional drag-reducing effect. Thus, the drag reducer can exert an excellent frictional drag-reducing effect on the aqueous medium in the pipe. In particular, the drag reducer added to fire-extinguishing water can effectively reduce the frictional drag of the fire-extinguishing water in the pipe, increasing the velocity of sprayed water and the distance over which the water travels to ensure fire extinction on the target.

BRIEF DESCRIPTION OF DRAWINGS

FIG. 1 is a graph plotting the relationship between the storage period and the viscosity (relative viscosity) of a polyalkylene oxide aqueous dispersion and a polyalkylene oxide aqueous solution.

DESCRIPTION OF EMBODIMENTS

The following describes embodiments of the present invention in detail.

The drag reducer according to the present invention contains a polyalkylene oxide aqueous dispersion.

The polyalkylene oxide aqueous dispersion contains a polyalkylene oxide, aluminum oxide, an electrolyte, and water. The polyalkylene oxide is present in a dispersed form in the polyalkylene oxide aqueous dispersion.

There is no particular limitation to the polyalkylene oxide contained in the polyalkylene oxide aqueous dispersion. Examples of the polyalkylene oxide include polymers, such as polyethylene oxide, ethylene oxide-propylene oxide copolymers, ethylene oxide-butylene oxide copolymers, ethylene oxide-styrene oxide copolymers, ethylene oxide-cyclohexene oxide copolymers, and ethylene oxide-epichlorohydrin copolymers. The polyalkylene oxide may be one of these listed polymers, or a combination of two or more. The polyalkylene oxide preferably has a viscosity average molecular weight of 100000 to 10000000, and more preferably 1000000 to 8000000.

The polyalkylene oxide is preferably polyethylene oxide or an ethylene oxide-propylene oxide copolymer. When the polyalkylene oxide is polyethylene oxide or an ethylene oxide-propylene oxide copolymer, the polyalkylene oxide still preferably has a viscosity average molecular weight of 100000 to 10000000, and more preferably 1000000 to 8000000.

There is no particular limitation to the shape of the polyalkylene oxide. However, from the standpoint of easy dispersion in an aqueous medium, the polyalkylene oxide preferably has a particle shape. The polyalkylene oxide in a particle shape may be spherical, elliptical, flattened, porous, etc., and there is no particular limitation on its morphology.

There is no particular limitation to the particle size of the polyalkylene oxide. However, from the standpoint of easy dispersion of the polyalkylene oxide in an aqueous medium, the polyalkylene oxide preferably has a mean particle size ($d_{50}$) of 250 μm or less, more preferably 180 μm or less, and particularly preferably 150 μm or less. The lower limit of the mean particle size ($d_{50}$) of the polyalkylene oxide is not particularly limited, and is, for example, 10 μm.

The content of the polyalkylene oxide is preferably 1 to 40 mass % based on the total mass of the polyalkylene oxide aqueous dispersion. 1 mass % or more of the content of the polyalkylene oxide can further enhance the frictional-drag reducing effect of the polyalkylene oxide aqueous dispersion. 40 mass % or less of the content of the polyalkylene oxide is likely to provide a polyalkylene oxide aqueous dispersion in which the polyalkylene oxide is homogeneously dispersed. From these standpoints, the content of the polyalkylene oxide is more preferably 10 to 30 mass %.

The content of the polyalkylene oxide is preferably 0.09 to 400 parts by mass, and more preferably 1.9 to 100 parts by mass, per part by mass of aluminum oxide. The content of the polyalkylene oxide falling within these ranges can further enhance the frictional-drag reducing effect of the polyalkylene oxide aqueous dispersion.

The dispersion medium for use in the polyalkylene oxide aqueous dispersion is an aqueous solution in which an electrolyte is dissolved (electrolyte aqueous solution).

The electrolyte for use is a compound that can minimize the swelling of the polyalkylene oxide and that can also make the polyalkylene oxide insoluble. Any type of electrolyte can be used, as long as it has these properties. Examples of the electrolyte include inorganic ammonium salts, such as ammonium sulfate and ammonium phosphate; inorganic sodium salts, such as trisodium phosphate and sodium silicate; and inorganic potassium salts, such as potassium sulfate and potassium carbonate. Of these, ammonium sulfate is suitably used because of its greater solubility in water.

The solvent for the electrolyte aqueous solution is water, but can also be a mixed solvent of water and a lower alcohol.

The concentration of the electrolyte in the drag reducer varies depending on the type of polyalkylene oxide to be dispersed. Typically, the mass ratio indicated by electrolyte/water is preferably 0.11 or more. 0.11 or more of the mass ratio indicated by electrolyte/water can reduce or prevent the dissolution of the polyalkylene oxide in a dispersion medium, thus providing a stable polyalkylene oxide aqueous dispersion. The mass ratio indicated by electrolyte/water is preferably 0.11 to 0.90, and more preferably 0.43 to 0.80.

The polyalkylene oxide aqueous dispersion contains aluminum oxide. The presence of aluminum oxide enhances the dispersion stability of the polyalkylene oxide in the polyalkylene oxide aqueous dispersion. From the standpoint of further enhanced dispersibility of the polyalkylene oxide, the aluminum oxide preferably has a mean particle size of 1 to 1000 nm, and more preferably 10 to 100 nm. Usable aluminum oxide includes commercially available alumina sols.

The content of aluminum oxide is typically preferably 0.1 to 11 mass %, and more preferably 0.3 to 5.3 mass %, based on the electrolyte aqueous solution on a solids basis. 0.1 mass % or more of the content of aluminum oxide is more likely to stabilize the dispersion of the polyalkylene oxide in the polyalkylene oxide aqueous dispersion. 11 mass % or less of the content of aluminum oxide can prevent the polyalkylene oxide aqueous dispersion from having an overly high viscosity, thus imparting a suitable fluidity to the dispersion.

The polyalkylene oxide aqueous dispersion may contain other additives to the degree that the properties of the drag reducer are not impaired. For example, to adjust the viscosity of the polyalkylene oxide aqueous dispersion, an inorganic compound, such as hydrophilic silica, a water-soluble polymer, or other component can be added to the dispersion. The water-soluble polymer may be selected from substances other than polyalkylene oxides. However, other types of polyalkylene oxide may be further added to the polyalkylene oxide aqueous dispersion to the degree that the effect of the present invention is not impaired. Depending on the intended use, additives, such as an antioxidant and a UV absorber may be added to the dispersion.

In the polyalkylene oxide aqueous dispersion described above, particles of the polyalkylene oxide are dispersed in the electrolyte aqueous solution without being dissolved in the dispersion medium.

Because of the stably dispersed polyalkylene oxide, even a large shear force exerted on the polyalkylene oxide aqueous dispersion does not easily cleave the chemical bonds in the molecules of the polyalkylene oxide. This means that the molecular structure of the polyalkylene oxide is stable against a shear force, and is not prone to shear fracture. The use of a polyalkylene oxide aqueous solution as a drag reducer as in a traditional manner allows a shear force to break the molecular structure of the polyalkylene oxide, making it more likely to decrease or eliminate the frictional-drag reducing effect. However, the use of the polyalkylene oxide aqueous dispersion is unlikely to face this problem.

The polyalkylene oxide aqueous dispersion described above is also excellent in storage stability. Specifically, whereas the polyalkylene oxide in traditional polyalkylene oxide aqueous solutions decomposes over the course of a storage period, with the aqueous solutions exhibiting significantly decreasing viscosity, the polyalkylene oxide aqueous dispersion is unlikely to exhibit such a decrease in viscosity. This indicates that even after being stored for a predetermined time period, a drag reducer containing the polyalkylene oxide aqueous dispersion is unlikely to become impaired in its frictional drag-reducing effect.

The drag reducer is unlikely to become impaired in its frictional drag-reducing effect, even when being subjected to shear, and is excellent in storage stability. Because of these advantages, the drag reducer has a variety of applications.

For example, in a system for delivering an aqueous medium through a pipe using a transfer pump and the like, the drag reducer described above can be suitably used to reduce the frictional drag of the aqueous medium in the pipe. In this delivery system, the presence of the drag reducer containing the polyalkylene oxide aqueous dispersion enables smooth delivery of the aqueous medium due to the effective reduction in frictional drag of the aqueous medium in the pipe.

In particular, when the drag reducer is pumped into a pipe through which an aqueous medium flows, using a pump, a shear force caused by the pump or a shear force occurring when the aqueous medium flows through the pipe is unlikely to break the polyalkylene oxide. Thus, even after the drag reducer is pumped into the pipe, the frictional drag-reducing effect is unlikely to be impaired. This sufficiently reduces the frictional drag of the aqueous medium flowing through the pipe.

After the polyalkylene oxide aqueous dispersion is combined with an aqueous medium, the dispersion is homogeneously mixed with the aqueous medium immediately. Because of these properties, the polyalkylene oxide aqueous dispersion can quickly reduce the frictional drag of the aqueous medium. In addition, because the polyalkylene oxide aqueous dispersion is homogeneously mixed with the aqueous medium without stirring for a long time or adding a large mechanical shear, the impact of the shear can be further mitigated. This also further decreases the chance of having the molecular structure of the polyalkylene oxide broken, ensuring the exertion of the frictional drag-reducing effect by the polyalkylene oxide. Thus, the drag reducer in this embodiment is particularly suitable for use, for example, in water that needs to be urgently sprayed as in the case of fire-extinguishing water.

Because of its excellent frictional drag-reducing effect on an aqueous medium, the drag reducer can further extend the distance over which the aqueous medium travels, when the medium is sprayed from the pipe.

For example, adding the drag reducer to fire-extinguishing water increases the velocity of the water at the time the water is sprayed from a hose and the distance over which the water travels, enabling efficient fire extinction. In addition, because of its increased viscosity due to the polyalkylene oxide contained in the drag reducer, the fire-extinguishing water can be well adhered to the target of fire extinction, and delay the evaporation of water, further ensuring fire extinction.

Before being pumped into a pipe, the drag reducer may be mixed with an aqueous medium to form a mixture, and this mixture may be pumped into a pipe using a transfer pump or similar device. Alternatively, the drag reducer and the aqueous medium may be independently pumped into a pipe. When they are pumped into a pipe independently, the drag reducer may be injected from either the upstream or downstream of the pipe. Because the drag reducer according to the present invention is less restricted by equipment, such as supply lines, the reducer is advantageous in equipment limitation.

There is no particular limitation to the method for producing the polyalkylene oxide aqueous dispersion. For example, the method comprising the following steps (1) to (3) may be used:

(1) the step of preparing an aluminum oxide aqueous dispersion,
(2) the step of dissolving an electrolyte in the aluminum oxide aqueous dispersion to prepare a dispersion medium, and
(3) the step of adding a polyalkylene oxide to the dispersion medium to prepare a polyalkylene oxide aqueous dispersion.

In step (1), aluminum oxide, which is a dispersion stabilizer, in a predetermined amount is added to water with stirring to prepare an aluminum oxide aqueous dispersion.

In step (2), an electrolyte is dissolved in the aqueous dispersion prepared in step (1) to prepare a dispersion medium. Before dissolving the electrolyte, the aqueous dispersion may be neutralized. Under acidic conditions, the stability of polyalkylene oxide is poor. However, if neutralization is performed, a polyalkylene oxide added in the subsequent step can be stably present in the dispersion medium. In this neutralization step, the dispersion medium may be adjusted to a pH of 6 to 8. The neutralization step may be performed in either step (1) or step (2), or between step (1) and step (2).

In step (3), a powdery polyalkylene oxide is added to the obtained dispersion medium little by little with stirring.

Performing the steps described above provides a polyalkylene oxide aqueous dispersion. The order of adding the aluminum oxide and electrolyte is not particularly limited. However, when a sol of aluminum oxide (an alumina sol) is used, the order described above is preferable to prevent aluminum oxide from flocculation caused by the electrolyte.

The polyalkylene oxide aqueous dispersion alone may be used as a drag reducer, or the polyalkylene oxide aqueous dispersion may be combined with other additives and/or other drag reducers to use the mixture as a drag reducer. A predetermined amount of water may be added to this drag reducer to use it as fire-extinguishing water or a fire-extinguishing agent. To use the drag reducer in fire-extinguishing water, the fire-extinguishing water is prepared so that the content of the polyalkylene oxide is preferably 0.001 to 10 parts by mass, and more preferably 0.01 to 5 parts by mass, per 100 parts by mass of the water contained in the fire-extinguishing water, from the standpoint of a greater frictional drag-reducing effect. The use of the drag reducer is not limited in fire-extinguishing water and a fire-extinguishing agent, and the reducer can have a variety of other applications.

EXAMPLES

The following Examples describe the present invention in more detail. However, the present invention is not limited to these embodiments of the Examples.

Example 1

11.9 g of alumina sol 200 (an aluminum oxide aqueous dispersion, mean particle size: 10 to 100 nm, solids content: 10%, Nissan Chemical Industries, Ltd.) was added to a 200-mL beaker, and 78.6 g of ion-exchanged water was added thereto at one time with stirring using a motor equipped with a stirrer to prepare an aqueous dispersion. This aqueous dispersion was stirred for about 5 minutes, and 0.6 g of a 35% NaOH aqueous solution was added thereto, while stirring was continued, followed by the addition of 59.7 g of ammonium sulfate. The mixture was stirred until the ammonium sulfate was dissolved, thereby preparing a dispersion medium. This dispersion medium had a pH of 6.8. While the thus-obtained dispersion medium was stirred, 49.8 g of a polyethylene oxide powder (Sumitomo Seika Chemicals Co., Ltd "PEO-18," mean particle size ($d_{50}$): 63 µm, the viscosity in the form of a 0.5% aqueous solution: 320 mPa·s, the viscosity average molecular weight in the form of a 0.5% aqueous solution: 4500000) as a polyalkylene oxide was gradually added thereto. The mixture was stirred until the polyethylene oxide powder was homogeneously dispersed, thereby obtaining a polyethylene oxide aqueous dispersion.

Subsequently, 6 L of ion-exchanged water was added to a 10-L vessel, and stirred with a flat blade (width 80 mm×height 25 mm) at a stirring rotation frequency of 120 rpm. 2.4 g of the polyethylene oxide aqueous dispersion was then added thereto to prepare a sample. In this sample, the polyethylene oxide aqueous dispersion was present in an amount of 400 ppm based on the ion-exchanged water, and the polyethylene oxide was present in an amount of 100 ppm based on the ion-exchanged water.

The sample immediately after the addition of the polyethylene oxide aqueous dispersion was measured for the depth of vortex Ds, and the depth of vortex Ds was 28 mm. This sample was immediately transferred using a magnet pump described later, and then measured for the depth of vortex Ds. The depth of vortex Ds of the transferred sample was 8 mm.

Example 2

A sample was prepared in the same manner as in Example 1 except that the amount of the polyethylene oxide aqueous dispersion added was 0.5 g. In this aqueous solution sample, the polyethylene oxide aqueous dispersion was present in an amount of 83 ppm based on the ion-exchanged water, and the polyethylene oxide was present in an amount of 20 ppm based on the ion-exchanged water.

The sample immediately after the addition of the polyethylene oxide aqueous dispersion was measured for the depth of vortex Ds, and the depth of vortex Ds was 33 mm. This sample was immediately transferred using a magnet pump described later, and then measured for the depth of vortex Ds. The depth of vortex Ds of the transferred sample was 25 mm.

Comparative Example 1

6 L of ion-exchanged water was added to a 10-L vessel, and stirred with a flat blade (width 80 mm×height 25 mm) at a stirring rotation frequency of 120 rpm, followed by the addition of 120 g of a 0.5% polyethylene oxide aqueous solution (the viscosity in the form of a 0.5% aqueous solution: 320 mPa·s). The mixture was stirred for 1 minute, thereby preparing a sample in which the polyethylene oxide was fully dissolved. In this aqueous solution sample, the polyethylene oxide was present in an amount of 100 ppm based on the ion-exchanged water.

This sample was measured for the depth of the generated vortex. Whereas the depth of vortex Ds before transfer using a magnet pump described later was 5 mm, the depth of vortex Ds after transfer using the magnet pump was 31 mm.

Preparation Example 1

6 L of ion-exchanged water was added to a 10-L vessel, and stirred with a flat blade (width 80 mm×height 25 mm) at a stirring rotation frequency of 120 rpm, followed by the addition of 2.4 g of the polyethylene oxide aqueous dispersion obtained in Example 1. The thus-prepared sample is denoted as "sample 1A." Sample 1A was continuously stirred for a period of about 1 hour, thereby preparing a sample in which the polyethylene oxide was fully dissolved. The thus-prepared sample is denoted as "sample 1B."

These samples were measured for the depth of the generated vortexes. The depth of vortex Ds of the sample immediately after the addition of the polyethylene oxide aqueous dispersion (i.e., sample 1A) was 28 mm. Whereas the depth of vortex of sample 1B before transfer using a magnet pump was 5 mm, the depth of vortex Ds of sample 1B after transfer using a magnet pump was 32 mm.

Preparation Example 2

6 L of ion-exchanged water was added to a 10-L vessel, and stirred with a flat blade (width 80 mm×height 25 mm) at a stirring rotation frequency of 120 rpm, followed by the addition of 0.5 g of the polyethylene oxide aqueous dispersion obtained in Example 1 (83 ppm based on the ion-exchanged water). The thus-prepared sample is denoted as "sample 2A." Sample 2A was continuously stirred for a period of about 1 hour, thereby preparing a sample in which the polyethylene oxide was fully dissolved. The thus-prepared sample is denoted as "sample 2B."

These samples were measured for the depth of the generated vortexes. The depth of vortex Ds of the sample immediately after the addition of the polyethylene oxide aqueous dispersion (i.e., sample 2A) was 33 mm. Whereas the depth of vortex of sample 2B before transfer using a magnet pump was 13 mm, the depth of vortex Ds of sample 2B after transfer using a magnet pump was 34 mm.

Evaluation of Vortex Suppression 300 g of each sample prepared in the Examples, Comparative Example, and Preparation Examples (25° C.) was weighed and individually placed in a glass beaker (diameter 75 mm×height 150 mm) containing a rotor (8 mm×30 mm), followed by stirring with a magnetic stirrer at 700 rpm. The depth of generated vortex was then measured.

The vortex suppression percentage P was determined by applying the depth of vortex measured above to the following equation.

$$P(\%)=[(Dw-Ds)/Dw]\times 100$$

In the equation above, Dw indicates the depth of vortex (mm) of ion-exchanged water, and Ds indicates the depth of vortex (mm) of a sample after transfer using a magnet pump as described later. The depth of vortex of ion-exchanged water was measured in the same manner as for the depth of vortex of the samples above. Specifically, the procedure to measure the depth of vortex of the samples was repeated except that the sample was replaced with ion-exchanged water. The depth of vortex Dw of ion-exchanged water measured was 35 mm.

The vortex suppression percentage after transfer using a magnet pump was evaluated as described below. The samples prepared in the Examples, Comparative Example, and Preparation Examples were transferred using a magnet pump (produced by Iwaki Co., Ltd.: IWAKI Magnet Pump MD-15R-N), and 300 g of each of the transferred aqueous solution samples (25° C.) was weighed and individually placed in a glass beaker (diameter 75 mm×height 150 mm) containing a rotor (8 mm×30 mm), followed by stirring with a magnetic stirrer at 700 rpm. The depth of generated vortex was then measured. The magnet pump used in the measurement had a maximum discharging volume of 16 L/min. To perform the transfer, 1 meter of a vinyl-chloride tube (outer diameter: 8 mm, inner diameter: 6 mm) was connected to each of the inlet and the outlet of the magnet pump.

Method for Measuring Viscosity of 0.5% Polyalkylene Oxide Aqueous Solution 497.5 g of ion-exchanged water was added to a 1-L beaker. While the water was stirred with a flat plate (width 80 mm×height 25 mm) at a tip peripheral speed of 1.0 m/s, 2.5 g of a polyalkylene oxide was added thereto, followed by continuous stirring for 3 hours, thereby preparing an aqueous solution. The obtained aqueous solution was immersed in a thermostatic bath at 25° C. for 30 minutes or more, and then measured for the viscosity with a B-type rotational viscometer (B-type viscometer produced by Tokimec, rotor number 2, rotation frequency 12 rpm, 3 minutes, 25° C.)

Method for Measuring Viscosity Average Molecular Weight of Polyalkylene Oxide

The viscosity average molecular weight [M] was calculated by applying the value of limiting viscosity [η] obtained with an Ostwald viscometer to the following Staudinger equation.

$$[\eta] = 6.4 \times 10^{-5} \times M^{0.82}$$

The solvent was pure water, and the measurement temperature was set at 35° C.

Method for Calculating Mean Particle Size ($d_{50}$) of Polyalkylene Oxide

The mean particle size of the polyalkylene oxide was calculated as described below. The polyalkylene oxide was classified using test sieves prescribed in JIS Z 8801. The remaining polyalkylene oxide in each sieve was measured (mass), and indicated by an integrated mass percentage. Thereafter, the particle size at an integrated value of 50% was determined to be mean particle size $d_{50}$.

TABLE 1

| | PEO Dispersion Concentration (ppm) | PEO Concentration (ppm) | Depth of Vortex Immediately after Addition of PEO (mm) | Depth of Vortex before Transfer with a Pump (mm) | Depth of Vortex after Transfer with a Pump (mm) | Vortex Suppression Percentage (%) |
|---|---|---|---|---|---|---|
| Example 1 | 400 | 100 | 28 | 28 | 8 | 77 |
| Example 2 | 83 | 20 | 33 | 33 | 25 | 29 |
| Comparative Example 1 | — | 100 | 5 | 5 | 31 | 11 |
| Preparation Example 1 | 400 | 100 | 28 | 5 | 32 | 9 |
| Preparation Example 2 | 83 | 20 | 33 | 13 | 34 | 3 |

*PEO denotes polyethylene oxide.

Table 1 shows the depth of vortex Ds (mm) and the vortex suppression percentage P (%) of the samples obtained in the Examples, Comparative Example, and Preparation Examples. In Table 1, the "Depth of Vortex Immediately after Addition of PEO" for the Examples and Comparative Example indicates the depth of vortex Ds (mm) observed immediately after the polyethylene oxide aqueous dispersions were added to ion-exchanged water, and the "Depth of Vortex Immediately after Addition of PEO" for Preparation Examples 1 and 2 indicates the depth of vortex Ds (mm) of samples 1A and 2A. In Table 1, the "Depth of Vortex before Transfer with a Pump" for the Examples and Comparative Example indicates the depth of vortex Ds (mm) of the samples that were obtained by adding polyethylene oxide aqueous dispersions to ion-exchanged water and that were immediately before transfer using a magnet pump, and the "Depth of Vortex before Transfer with a Pump" for Preparation Examples 1 and 2 indicates the depth of vortex Ds (mm) of samples 1B and 2B. In Table 1, the "Depth of Vortex after Transfer with a Pump" indicates the depth of vortex Ds (mm) of the samples after transfer using a magnet pump.

As seen in Examples 1 and 2, when the samples were transferred using a pump immediately after the polyethylene oxide aqueous dispersions were added, the samples were less affected by the mechanical shear caused by the pump, exhibiting a higher vortex suppression effect. This indicates that the samples obtained in Examples 1 and 2 had a high frictional drag-reducing effect.

In contrast, when a polyethylene oxide aqueous solution, not a polyethylene oxide aqueous dispersion, is used, as seen in Comparative Example 1, the generation of vortex after transfer using a magnet pump is not suppressed.

Reference: Evaluation of Storage Stability

As reference, the storage stability of a polyalkylene oxide aqueous dispersion was evaluated from the change in viscosity of the dispersion.

FIG. 1 shows the changes in viscosity of the polyalkylene oxide aqueous dispersion prepared in Example 1 and the polyalkylene oxide aqueous solution of Preparation Example 1. Specifically, FIG. 1 shows how the viscosity of the polyalkylene oxide aqueous dispersion and the polyalkylene oxide aqueous solution changed over the course of a storage period from immediately after preparation. The polyalkylene oxide aqueous dispersion and the polyalkylene oxide aqueous solution were both subjected to nitrogen replacement, and stored at 40° C. The viscosity of the dispersion and the solution was measured at predetermined points in time. The viscosity was measured with a commercially available B-type rotational viscometer (stirring rotation frequency: 12 rpm, stirring time: 3 minutes). In FIG. 1, the y-axis shows a viscosity of each the polyalkylene oxide aqueous dispersion and the polyalkylene oxide aqueous solution relative to the viscosity of each of the dispersion and the solution immediately after preparation (day 0), each taken as 100. To measure the viscosity of the polyalkylene oxide aqueous dispersion, the dispersion was diluted to prepare a measurement sample in the form of an aqueous solution, and the viscosity of this aqueous solution was measured.

As is clear from FIG. 1, whereas the polyalkylene oxide aqueous solution exhibited a viscosity significantly lowering over the course of a storage period, the polyalkylene oxide aqueous dispersion only demonstrated a slight decrease in viscosity, compared with the polyalkylene oxide aqueous solution. This suggests that the polyalkylene oxide in the polyalkylene oxide aqueous solution decomposed over time, thus decreasing its viscosity. However, such decomposition is likely to have been suppressed in the polyalkylene oxide aqueous dispersion. The results suggest that because of the presence of the undissolved and dispersed polyalkylene oxide, the polyalkylene oxide aqueous dispersion had excellent storage stability.

INDUSTRIAL APPLICABILITY

The drag reducer according to the present invention has a high frictional drag-reducing effect, and is unlikely to be impaired in the effect even when being subjected to a large shear. Thus, the reducer is suitably used to reduce the frictional drag of aqueous media, and the like, and particularly suitable for applications in, for example, fire-extinguishing water and fire-extinguishing agents.

The invention claimed is:

1. A fire-extinguishing composition comprising a drag reducer,
the drag reducer comprising a polyalkylene oxide aqueous dispersion and water,
the dispersion comprising a polyalkylene oxide, aluminum oxide, an electrolyte, and water,
the dispersion having the polyalkylene oxide dispersed therein,
the composition containing the polyalkylene oxide in an amount of 0.001 to 1 part by mass, per 100 parts by mass of the total amount of water present in the fire-extinguishing composition, and
the polyalkylene oxide having a viscosity average molecular weight of 100,000 to 10,000,000.

2. The fire-extinguishing composition according to claim 1, wherein the polyalkylene oxide comprises at least one member selected from the group consisting of polyethylene oxides and ethylene oxide-propylene oxide copolymers.

3. The fire-extinguishing composition according to claim 1, wherein the electrolyte comprises at least one member selected from the group consisting of ammonium sulfate and ammonium phosphate.

4. The fire-extinguishing composition according to claim 1, wherein the mass ratio of the electrolyte to the water, electrolyte/water, is 0.11 or more.

5. The fire-extinguishing composition according to claim 1, for use in an aqueous medium.

6. The fire-extinguishing composition according to claim 5, wherein the aqueous medium is fire-extinguishing water.

7. A fire-extinguishing agent comprising the fire-extinguishing composition according to claim 1.

8. A method for producing the fire-extinguishing composition according to claim 1,
the method comprising the following steps (1) to (3),
(1) a step of preparing an aluminum oxide aqueous dispersion,
(2) a step of dissolving an electrolyte in the aluminum oxide aqueous dispersion to prepare a dispersion medium, and
(3) a step of adding a polyalkylene oxide to the dispersion medium to prepare a polyalkylene oxide aqueous dispersion.

9. The method for producing a fire-extinguishing composition according to claim 8, wherein the polyalkylene oxide comprises at least one member selected from the group consisting of polyethylene oxides and ethylene oxide-propylene oxide copolymers.

10. The method for producing a fire-extinguishing composition according to claim 9, wherein the mass ratio of the electrolyte to the water, electrolyte/water, is 0.11 or more.

11. The method for producing a fire-extinguishing composition according to claim 8, wherein the electrolyte comprises at least one member selected from the group consisting of ammonium sulfate and ammonium phosphate.

12. A method for extinguishing a fire comprising applying the fire-extinguishing composition according to claim 1 to a fire.

13. The method for extinguishing a fire according to claim 12, wherein the electrolyte comprises at least one member selected from the group consisting of ammonium sulfate and ammonium phosphate.

14. The method for extinguishing a fire according to claim 12, wherein the mass ratio of the electrolyte to the water, electrolyte/water, is 0.11 or more.

15. A fire-extinguishing composition comprising a drag reducer,
the drag reducer comprising a polyalkylene oxide aqueous dispersion and water,
the dispersion comprising a polyalkylene oxide, aluminum oxide, an electrolyte, and water,
the dispersion having the polyalkylene oxide dispersed therein,
the composition containing the polyalkylene oxide in an amount of 0.001 to 1 part by mass, per 100 parts by mass of the total amount of water present in the fire-extinguishing composition, and
the electrolyte comprising at least one member selected from the group consisting of ammonium sulfate and ammonium phosphate.

16. The fire-extinguishing composition according to claim 15, wherein the polyalkylene oxide comprises at least one member selected from the group consisting of polyethylene oxides and ethylene oxide-propylene oxide copolymers.

17. The fire-extinguishing composition according to claim 15, wherein the mass ratio of the electrolyte to the water, electrolyte/water, is 0.11 or more.

18. The fire-extinguishing composition according to claim 15, for use in an aqueous medium.

19. The fire-extinguishing composition according to claim 18, wherein the aqueous medium is fire-extinguishing water.

20. A fire-extinguishing agent comprising the fire-extinguishing composition according to claim 15.

* * * * *